United States Patent Office.

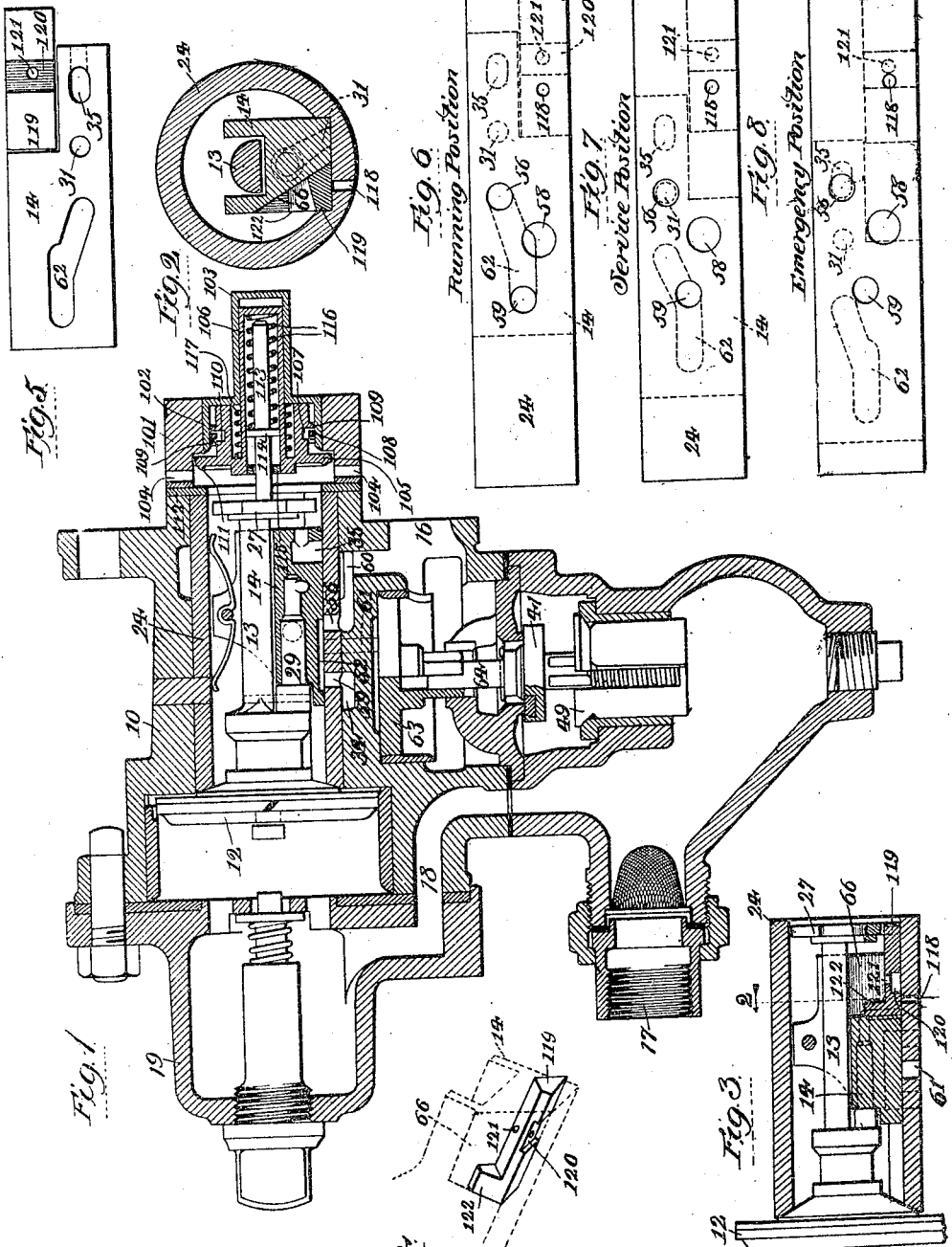

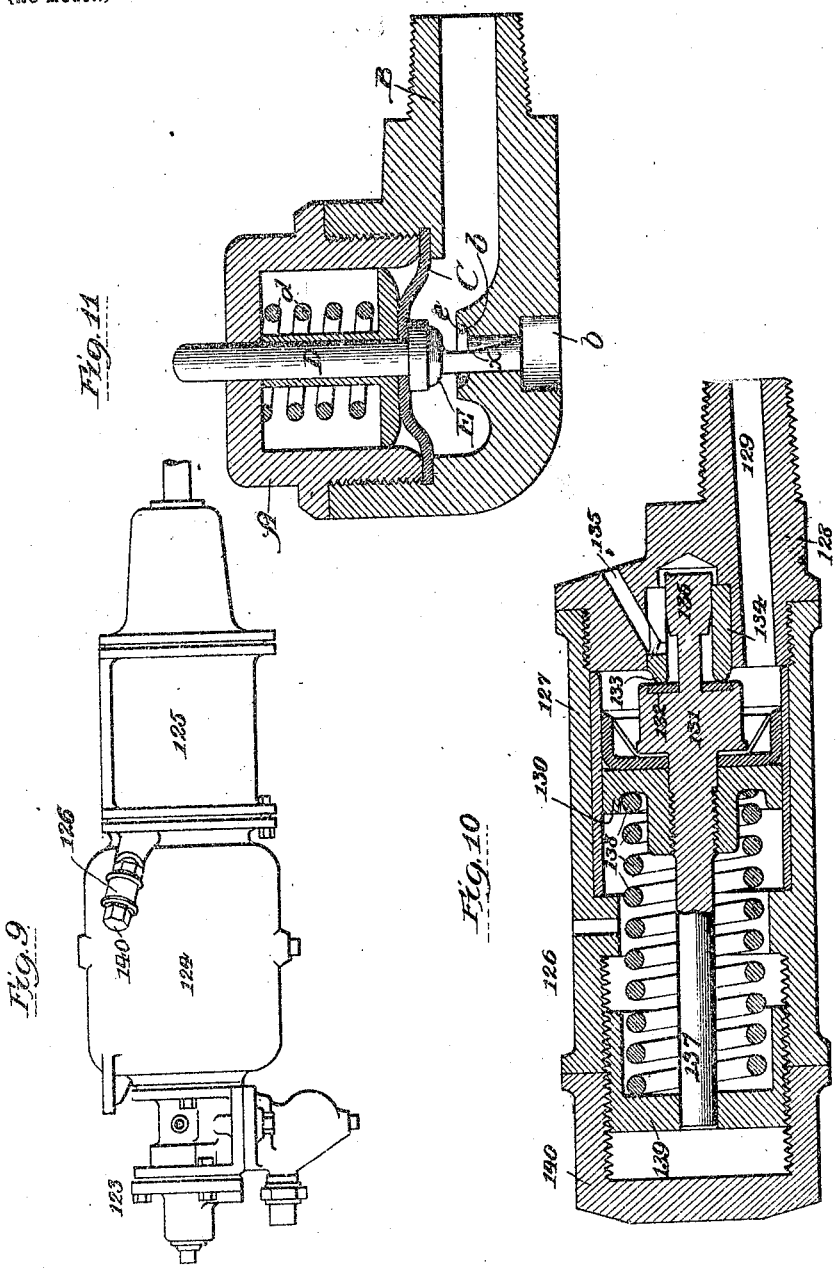

MAURY W. HIBBARD, OF CHICAGO, ILLINOIS, ASSIGNOR TO RICHARD FITZGERALD, OF SAME PLACE.

FLUID-PRESSURE BRAKE.

SPECIFICATION forming part of Letters Patent No. 619,481, dated February 14, 1899.

Application filed October 10, 1898. Serial No. 693,122. (No model.)

*To all whom it may concern:*

Be it known that I, MAURY W. HIBBARD, residing at Chicago, in the county of Cook and State of Illinois, have invented certain new and useful Improvements in Fluid-Pressure Brakes, of which the following is a specification.

The object of my invention is to produce a quick-acting triple valve operating in a high-speed brake system, which valve will be capable of retaining a high equalized pressure in the auxiliary reservoir after actuation of the brakes in emergency and also capable of permitting a quick release of the brakes after such emergency action.

My invention is designed as an improvement upon that type of quick-acting triple valve in which the auxiliary emergency-valve is used, as exemplified in Westinghouse patent No. 376,837, issued January 24, 1888.

In the drawings, Figure 1 is a sectional elevation of a triple valve of the class or type described to which my invention is shown applied; Fig. 2, a section on line 2 of Fig. 3; Fig. 3, a section taken through the slide-valve on a different plane than that shown in Fig. 1; Fig. 4, a view in perspective of a valve supplemental to the main valve; Fig. 5, a face view of the main valve. Figs. 6, 7, and 8 are views of the valve-seat, showing the main valve in dotted lines in the different positions of the brakes; Fig. 9, an elevation of a triple valve, a brake-cylinder, and an auxiliary reservoir of a freight-brake, showing a pressure-reducing valve secured in the oil-port of the brake-cylinder; Fig. 10, a section of a pressure-reducing valve that may be adopted to reduce the brake-cylinder pressure; and Fig. 11 a section of a modified form of a pressure-reducing valve.

The valve device shown in the drawings is the standard Westinghouse valve now in common use, as substantially shown in said Patent No. 376,837, and for convenience I have numbered the principal parts in the same manner as in said patent. The general features of this valve being so well known will require no special description or mention except as they are directly concerned with the operation of the added parts. It will be understood that I take the Westinghouse triple valve now on the market and in general use and add thereto the parts embodying my invention, as hereinafter described.

My improved triple-valve device is designed to operate in a high-speed brake system in which a pressure-reducing valve is connected with the brake-cylinder or with its connections, so as to reduce the high pressure in the brake-cylinder proportionate to the decrease in speed of the train to prevent the sliding of the wheels.

In Figs. 10 and 11 are shown two forms of pressure-reducing valve which may be adopted; but it is to be understood that the operation of my device is not limited to any specific structure of such valves shown, inasmuch as any suitable pressure-reducing valve performing the desired functions may be employed.

Adjacent to the passage communicating between the auxiliary reservoir and triple-valve chamber and secured, preferably, to the triple-valve casing in any suitable manner is a hollow casing 101, in which is preferably arranged a bushing 102, having a closed extension 103. The casing has transverse passages 104, forming communication between the auxiliary reservoir and the triple-valve chamber. Within the casing 101 travels a piston 105, having a stem 106, guided in the extension 103. The piston is provided with an annular groove 107, in which is arranged a split packing-ring 108. On either side of the groove are annular flanges 109, one of which has radial grooves 110 to permit the free flow of air when the piston moves outwardly to the normal position shown. The inner side or face of the piston adjacent to the triple-valve chamber is provided with an annular bead 111, adapted to seat on the gasket 112 in the inward movement of the piston—that is, the movement to the left, Fig. 1.

The piston 105 has a bore, in which is a rod or stem 113, having a collar 114, whereby the travel of the rod is limited by the striking of such collar against the ring 115 in the piston. A coil-spring 116 exerts its tension on the rod and abuts, respectively, against the collar and the closed end of the piston-stem. This spring tends to thrust the rod toward and in contact with the stem 13 of the triple-valve piston 12. A second coil-spring 117 abuts the piston 105 and the inner face of the bushing 102, as shown, and tends to seat such piston.

The main slide-valve 14 is the same as used in the standard Westinghouse valve, as shown in Fig. 1, and is substantially the same as the slide-valve shown in Fig. 4 of said Patent No. 376,837, except that the cut-away portion 66 is carried to the end, being the top end in said Fig. 4. In the slide-valve bushing and opening into this cut-away portion I provide a port 118, which forms communication between the main-valve or slide-valve chamber and the brake-cylinder through the passages 60 and 16. A small slide-valve 119 is adapted to fit and operate in such cut-away portion and to govern the port 118. It is preferably provided with the transverse recess 120 on its lower face and also has a vertical hole or passage 121, communicating with such recess. This small slide-valve, which may be termed for convenience a "supplemental" valve, is loosely arranged on the seat and remains unmoved, except in emergency action, when the collar 27 will contact the shoulder 122 of such slide-valve. The restoration of the main slide-valve after emergency action also restores the small slide-valve to normal position.

In service action the old parts operate to give service operation of the brakes in the usual manner and no movement of the added mechanism occurs, except that the rod 113 follows the stem 13 in its travel and remains in contact with such stem. In this action the spring 116 still holds the piston 105 in its normal position and against the seating tendency of spring 117. In the restoration of train-pipe pressure and the release of the brakes the main piston 12 is returned and the rod 113 is likewise returned to a normal position. (Shown in Fig. 1.)

In emergency action the main piston 12 makes its full travel and the rod 113 follows it as far as permitted by its collar 114, but cannot travel the full distance because of contact of the collar with the ring 115. This movement of the rod 113 eliminates the effect of the spring 116, and the spring 117 will after a short interval seat the piston 105 and close the auxiliary reservoir from the main-valve chamber. The spring can only move its piston as rapidly as the split packing-ring permits air to pass it and leak through and around the flanges 109, which are fitted loosely in the chamber of casing 101. The piston 105 will not, therefore, immediately close the ports 104 to cut off communication with the auxiliary reservoir, but will move comparatively slow and reach its seat immediately after equalization occurs between the auxiliary reservoir and brake-cylinder. By these means the high pressure as equalized in emergency action is retained in the auxiliary reservoir and not permitted to blow down through a pressure-reducing valve, such as shown on Sheet 2 of the drawings and hereinafter described. The pressure-reducing valve will therefore reduce the pressure in both the brake-cylinder and main-valve chamber to, say, fifty pounds, or to any other predetermined pressure at which the pressure-reducing valve may be set, and the pressure in such main-valve chamber will be lower than in the auxiliary reservoir, which will contain high emergency pressure. The brakes can now be released by restoration of train-pipe pressure substantially equal to the pressure in the main-valve chamber, which is the same as the reduced brake-cylinder pressure.

In the travel of the main piston 12 and its slide-valve 14 to normal position after emergency action the ports 56 and 58 are closed from the brake-cylinder on the first movement, and such closure will form an air-tight compartment out of the main-valve chamber and lock the air therein. The inward travel of the main piston would therefore increase the pressure in such main-valve chamber, and the brakes may not be released by a pressure less than auxiliary-reservoir pressure, as designed. The object of the small port 121 is to prevent such locking of the air in the main-valve chamber and allow the brakes to be released by a train-pipe pressure substantially equal to the reduced brake-cylinder pressure. In the return of the main piston the air will be free to pass into the brake-cylinder, which is of course of much greater capacity. The small slide-valve 119 governs the small passage or port 121 and covers the same, except in emergency action, when the collar 27 on the stem 13 of the main piston will contact the shoulder 122 and move such small slide-valve or supplemental valve a slight distance to the left, Fig. 1, whereupon communication will be established between the main-valve chamber and the brake-cylinder. (See Fig. 8.) The main slide-valve will move almost to normal position and connect the release-ports before it will contact the small slide-valve and restore it to normal position, closing port 118.

After the train-pipe air has fed into the main-valve chamber to equalize with the air confined in the auxiliary reservoir and after the stem 13 has contacted the rod 113 the piston 105 will unseat and establish communication between the auxiliary reservoir and the main-valve chamber, and be thus restored to normal position, as shown in Fig. 1.

In Fig. 9 is shown a triple-valve device 123, an auxiliary reservoir 124, a brake-cylinder 125, and a pressure-reducing valve 126, which may be conveniently secured in the oil-port of the brake-cylinder, although it would subserve its functions in the same manner if connected elsewhere to the brake-cylinder or be put in communication with the brake-cylinder connections. In Fig. 10 is shown a form of device which will answer the purposes of a pressure-reducing valve. This device comprises a main casing 127, which is screwed upon or otherwise secured to a screw-plug 128, which in turn screws into the brake-cylinder or its connections and whose passage 129 communicates, respectively, with the brake-cylinder and the interior of the casing. Within the casing travels a piston 130, with an enlarged item 131, forming a valve provided with a gasket 132, adapted to fit upon an annular seat 133 of a bushing 134. An exhaust port or passage 135 extends through this bushing below the seat and through the plug to the atmosphere. The extreme end 136 of the inner stem of the piston forms a valve for governing the port 135, and the end thereof on the side toward the piston is cut away or beveled to provide for a slow initial reduction of pressure and a subsequent increased reduction of pressure after the piston has made its outward travel due to the excess pressure in the brake-cylinder. The outer stem 137 of the piston is surrounded by a coiled spring 138, which abuts, respectively, against piston 130 and a tension adjusting-nut 139, by which the stem 137 is guided and which is locked by a lock-nut 140.

When the pressure in the brake-cylinder rises above the predetermined point at which the device is set and which is regulated by the adjusting-nut 139, the piston 130 will be forced outward against the tension of spring 138 and the valve 131 will be lifted from its seat, but at the same time valve 136 is carried outward to partially close port 135. A slow initial reduction is now permitted; but as the pressure becomes reduced the area of the passage is increased, owing to the shape of the valve 136, and the reduction of pressure therefore increases rapidly as it nears the predetermined pressure.

In Fig. 11 is shown a modified form of pressure-reducing valve, comprising a casing or valve-box consisting of a cap A and a plug B, the latter being preferably screw-threaded and adapted to be screwed into the brake-cylinder or otherwise placed in communication therewith. A flexible diaphragm C is at its center secured to a valve-stem D and at its circumference clamped under the cap of the valve-box. The valve-stem D is at its upper part surrounded by a helical spring, the force of which is adjusted to the maximum pressure desired in the brake-cylinder. The lower part of the stem is formed as a valve E, which fits the seating e at the edge of a hole b through the bottom of the valve-box. The stem projects into the hole, filling it, but not tightly, and a part of the side of this stem is grooved or flattened in the taper form, as shown at x, so as to give a passage for air varying in area according to the position of the valve.

While the pressure in the brake-cylinder with which the valve-box communicates remains lower than that to which the spring is adjusted, the valve remains closed; but should the pressure exceed that amount then the diaphragm C is bulged upward, as shown in Fig. 11, the stem D rising and opening the outlet-valve, so that the air escapes and the pressure in the valve-box becomes reduced. By making the valve-stem tapered in the manner shown the escape of air and consequent reduction of pressure is rendered most rapid when the valve begins to open. The form of the notch or flattened part may, however, be varied to suit the conditions of the brake apparatus to which the escape-valve is applied. By suitably grooving or flattening the stem, as above described, the reduction of the pressure can be adjusted to suit the increase of friction as the velocity diminishes. It is obvious that a piston working in the valve-box might be substituted as an equivalent for the diaphragm.

This invention applies to that class of triple valves having an auxiliary emergency-valve, and the main features of such invention in connection with such auxiliary valve are the retaining of the high equalized emergency pressure in the auxiliary reservoir for future use; the reducing of the high pressure in the brake-cylinder as the speed of the train decreases, thereby preventing the sliding of the wheels, and the obtaining of a quick release of the brakes.

My invention obtains other advantageous results, particularly in the release of what are known in the practical art as "stuck" brakes. In the operation of railway-brakes in emergency action some of the brakes will release as soon as equalization occurs between the train-pipe pressure and the auxiliary-reservoir-pressure, while others of the brakes will stick and not release until the train-pipe pressure is increased above auxiliary-reservoir pressure. This necessitates the filling of the auxiliary reservoirs of those brakes that release before the train-pipe pressure can be increased to release the stuck brakes. This condition cannot arise when my improvements are applied to the valve, for the reason that the pressure on the inner side of the main piston is so much less than that in the auxiliary reservoir that all the brakes will be released before the communication between the auxiliary reservoir and triple-valve chamber is opened. Consequently in releasing stuck brakes it is only necessary to fill the train-pipe of small capacity instead of filling auxiliary reservoirs of large capacity.

While I have herein described my invention as applied to that type of triple valves which in emergency action vent fluid under pressure from the train-pipe into the brake-cylinder, it will be understood that the same may also be applied to that type of triple valves which obtain emergency action by venting the train-pipe pressure to the atmosphere.

I claim—

1. In a brake mechanism, the combination of a triple valve controlling the brake release and also the admission of fluid under pressure from the auxiliary reservoir to the brake-cylinder, an auxiliary valve for releasing fluid under pressure from the train-pipe in emergency action and valve mechanism for cutting off communication between the auxiliary reservoir and the brake-cylinder after equalization therebetween during emergency application of the brakes.

2. In a brake mechanism, the combination of a main valve operating in a chamber to control the brake release and also the admission of fluid under pressure from the auxiliary reservoir to the brake-cylinder, an auxiliary valve for releasing fluid under pressure from the train-pipe in emergency action and a piston-actuated valve to close communication between the auxiliary reservoir and main-valve chamber after equalization between the auxiliary reservoir and the brake-cylinder in emergency action.

3. In a brake mechanism, the combination of a main valve operating in a chamber to control the brake release and also the admission of fluid under pressure from the auxiliary reservoir to the brake-cylinder, an auxiliary valve for releasing fluid under pressure from the train-pipe in emergency action, valve mechanism for cutting off communication between the auxiliary reservoir and main-valve chamber in emergency action after equalization between the brake-cylinder and auxiliary reservoir, and valve mechanism for maintaining communication between the brake-cylinder and main-valve chamber until the brakes are released after an emergency application of the brakes.

4. In a brake mechanism, the combination of a main or triple valve operating in a chamber, an auxiliary emergency-valve, means for cutting off communication between the auxiliary reservoir and main-valve chamber in emergency action after equalization between the brake-cylinder and auxiliary reservoir, and a valve for maintaining communication between the main-valve chamber and the brake-cylinder after emergency action and before brake release and actuated by the main valve.

5. The combination of a main valve operating in a chamber and governing ports between said chamber and the brake-cylinder and atmosphere, an auxiliary emergency-valve, valve mechanism for cutting off communication between the brake-cylinder and auxiliary reservoir in emergency action after equalization between the brake-cylinder and auxiliary reservoir, a supplemental port between the brake-cylinder and main-valve chamber, and a supplemental valve in said chamber normally closing said supplemental port and actuated in emergency action by the main valve to open the same.

6. In a brake mechanism, the combination of a main valve operating in a chamber to control communication between an auxiliary reservoir, a brake-cylinder and the atmosphere, an auxiliary emergency-valve, and a valve controlling the passage between the auxiliary reservoir and the main-valve chamber and maintaining the passage open during service action but closing said passage after equalization between the auxiliary reservoir and brake-cylinder in emergency action.

7. In a brake mechanism, a triple valve operating in a chamber for controlling passages between an auxiliary reservoir, a brake-cylinder and the atmosphere, an emergency-valve auxiliary to the triple valve for releasing fluid under pressure from the train-pipe, a valve for closing communication between the auxiliary reservoir and the triple-valve chamber and brake-cylinder after emergency action and during the release after such action, in combination with a pressure-reducing device to reduce the pressure in the triple-valve chamber and brake-cylinder to any predetermined amount.

8. In a brake mechanism, the combination with a train-pipe, an auxiliary reservoir and a brake-cylinder, of a chamber or casing having direct connections to the brake-cylinder, and to the train-pipe respectively, a valve controlling communication between said connections, a piston or diaphragm which is independent of and unconnected with a triple-valve piston and is actuated by pressure from the auxiliary reservoir in direction to impart opening movement to said valve, and valve mechanism for closing communication between the auxiliary reservoir and the said chamber after equalization between the auxiliary reservoir and the brake-cylinder in emergency action.

9. In a brake mechanism, the combination with a train-pipe, an auxiliary reservoir and a brake-cylinder, of a triple-valve chamber or casing having direct connections to the brake-cylinder and to the train-pipe respectively, a piston-actuated triple valve therein controlling communication between said connections, a piston or diaphragm which is independent of and unconnected with the triple-valve piston and is actuated by pressure from the auxiliary reservoir in direction to impart opening movement to said valve, valve mechanism for closing communication between the auxiliary reservoir and the said chamber after equalization between the auxiliary reservoir and the brake-cylinder in emergency action, and a valve supplemental to the triple valve for maintaining communication between the brake-cylinder and the triple-valve chamber after an emergency action.

10. In a brake mechanism, a triple-valve device operating in a chamber to control ports and passages between an auxiliary reservoir, a brake-cylinder and the atmosphere, an emergency-valve auxiliary to the triple-valve device, means for closing communication between the auxiliary reservoir and triple-valve chamber after emergency action, means for preserving communication between the triple-valve chamber and the brake-cylinder after the initial movement of the triple valve in the release of the brakes after emergency action, in combination with a pressure-reducing device to reduce the pressure in the brake-cylinder and triple-valve chamber to any predetermined amount.

11. In a brake mechanism having a triple valve operative in a chamber and an auxiliary emergency-valve, a pressure-reducing valve to reduce the pressure in the brake-cylinder and triple-valve chamber, in combination with means for maintaining in the auxiliary reservoir the high pressure as equalized in emergency action.

12. In a brake mechanism having a triple valve operative in a chamber and governing the brake release and the service application of the brakes, an auxiliary emergency-valve operated by said triple valve, means for maintaining in the auxiliary reservoir the high pressure as equalized in emergency action, in combination with a pressure-reducing valve for reducing the pressure in the brake-cylinder proportionate to the decrease in velocity of the wheels.

13. In a brake mechanism, a main or triple valve operating in a chamber, an auxiliary emergency-valve, means for cutting off communication between the auxiliary reservoir and the main-valve chamber in emergency action after equalization between the auxiliary reservoir and brake-cylinder, and a valve for maintaining communication between the main-valve chamber and brake-cylinder, in combination with a pressure-reducing device adapted to give, in emergency action, a reduction increasing in rapidity as the brake-cylinder pressure approaches a predetermined pressure.

14. In a brake mechanism, a triple valve operating in a chamber, the chamber being normally in communication with an auxiliary reservoir but closed therefrom after equalization between the auxiliary reservoir and the brake-cylinder in emergency action, means for closing such chamber after said equalization, an auxiliary valve for releasing fluid under pressure from a train-pipe, in combination with a pressure-reducing valve whose action in service application of the brakes is rapid in reducing the pressure to a predetermined amount and whose action in emergency operation of the brakes is slow and increases in rapidity as the pressure approaches a predetermined amount.

MAURY W. HIBBARD.

Witnesses:
SAMUEL E. HIBBEN,
LOUISE E. SERAGE.